Jan. 10, 1933.                G. BOURQUIN                1,893,880
                              POWDER DISPENSER
                            Filed Sept. 9, 1930
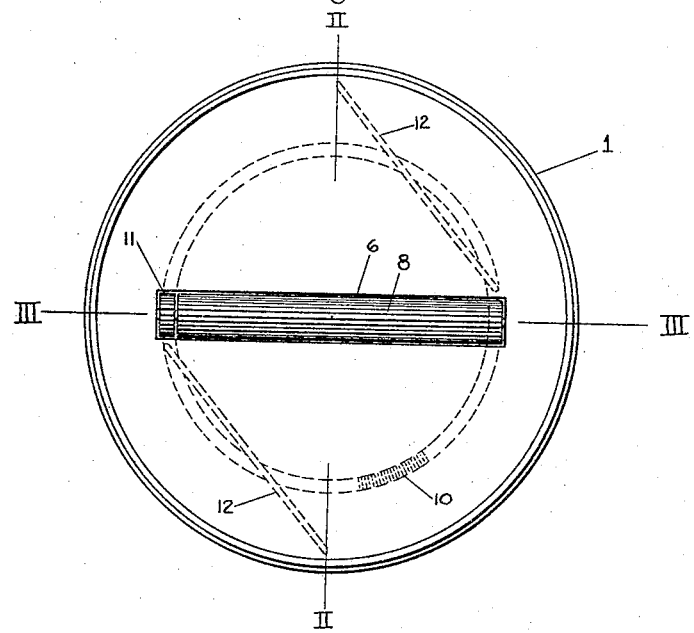
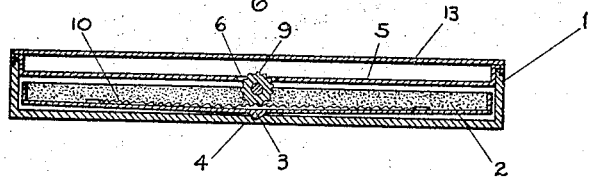
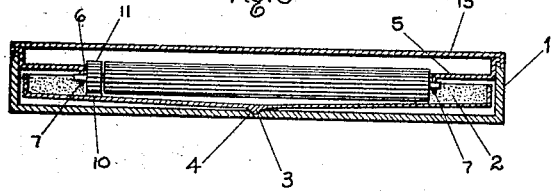
Georges Bourquin
INVENTOR
BY Frank Wilen
ATTORNEY Patented Jan. 10, 1933

1,893,880

UNITED STATES PATENT OFFICE

GEORGES BOURQUIN, OF PARIS, FRANCE, ASSIGNOR TO LENTHERIC, SOCIETE ANONYME, OF PARIS, FRANCE

POWDER DISPENSER

Application filed September 9, 1930, Serial No. 480,653, and in France September 20, 1929.

This invention relates to powder dispensers and has for its object the provision of a device for conveniently and efficiently delivering loose face powder or the like to an applicator, especially a puff, in an amount not substantially exceeding temporary requirements.

Essentially the device comprises a casing, a receptacle supported thereby, an apertured partition fixed to the casing above the receptacle, and a rotary conveyor—preferably having depressions, for example longitudinal grooves, in its surface for receiving and carrying the powder—extending into the receptacle and protruding segmentally through the aperture. When powder has been introduced into the receptacle, the device is operated simply by drawing a puff or the like over the segmentally protruding portion of the conveyor; and the diametrically opposite portion of the conveyor, having been immersed in the powder of the receptacle and having received the powder in its depressions, is thus brought by rotation to the aperture, and there delivers its burden to the puff.

Preferably, means are furnished whereby the receptacle may be caused to rotate so as to urge its contents against the conveyor, eliminating the necessity of shaking the dispenser for that purpose. This is accomplished by supporting the receptacle so that it can rotate, and gearing it positively to the conveyor: as by friction; or by fixing an annular toothed rack to the bottom of the receptacle and fixing the conveyor to, or forming an end or the entirety thereof as, a pinion engaging the rack. Obviously, the receptacle will be set in motion simultaneously and rotate concurrently with the conveyor. Suitable baffles may be attached to the underside of the apertured partition to aid in directing the powder against the conveyor.

Of course, the casing may be covered with a suitable top.

An example of the invention is shown by the accompanying drawing wherein:

Figure 1 is a plan view of a powder dispenser of my invention, with the top of the casing removed;

Figure 2 is a sectional view on line II—II of Figure 1; and

Figure 3 is a sectional view on line III—III of Figure 1.

In the drawing 1 represents a casing; 2, a rotary receptacle having on its underside a conical pivot 3 supported in a conical depression 4 in the bottom of casing 1; 5, a partition apertured as at 6 and fixed to casing 1 above receptacle 2. Transverse edges of aperture 6 are turned down to form lugs 7, in which is journaled an arbor. To the major part of the arbor, beginnig at one end thereof, is fixed an elongated pinion 8 which protrudes segmentally, as at 9, through aperture 6 and which engages positively the annular toothed rack 10 fixed to the bottom of receptacle 2; and at the other end of the arbor is mounted a cogged idler 11 which also engages, and is of approximately the same width as, rack 10. Baffles 12 are attached to the underside of partition 5. A top 13 covers the casing 1.

To use the powder dispenser, having introduced powder into receptacle 2, it is necessary only to draw a puff across segmental portion 9 of pinion 8. Motion is thus communicated to receptacle 2, which by rotation urges powder against pinion 8; and the powder is received in the grooves of pinion 8 and carried thereby to the puff. Cogged idler 11 steadies the operation of the mechanism; and baffles 12 serve to direct the powder against pinion 8 when receptacle 2 is rotated.

It is to be understood that the foregoing specific description is merely illustrative and by no means limitative of the invention, which may be variously otherwise embodied—for instance as to the form and position of the conveyor, the mode of gearing the conveyor to the receptacle, and the manner in which the receptacle is supported by the casing—within the scope of the appended claims.

Claims:

1. In a powder dispenser, a receptacle, an apertured partition thereabove, and an axially supported rotary conveyor extending into said receptacle and protruding through said aperture so that a puff above said partition may contact with the protruding portion of said conveyor.

2. In a powder dispenser, a receptacle, an apertured partition thereabove, and an axially supported rotary conveyor having depressions in its surface and extending into said receptacle and protruding through said aperture so that a puff above said partition may contact with the protruding portion of said conveyor.

3. In a powder dispenser, a receptacle, an apertured partition thereabove, and an axially supported rotary longitudinally grooved conveyor extending into said receptacle and protruding through said aperture so that a puff above said partition may contact with the protruding portion of said conveyor.

4. A powder dispenser comprising a casing, a receptacle therein, an apertured partition fixed to said casing above said receptacle, and an axially supported rotary conveyor extending into said receptacle and protruding through said aperture so that a puff above said partition may contact with the protruding portion of said conveyor.

5. A powder dispenser comprising a casing, a receptacle therein, an apertured partition fixed to said casing above said receptacle, and an axially supported rotary longitudinally grooved conveyor extending into said receptacle and protruding through said aperture so that a puff above said partition may contact with the protruding portion of said conveyor.

6. In a powder dispenser, a receptacle, an apertured partition thereabove, and a rotary conveyor extending into said receptacle and protruding through said aperture, said receptacle being geared to rotate upon the rotation of said conveyor.

7. A powder dispenser comprising a casing, a rotary receptacle suported thereby, an apertured partition fixed to said casing above said receptacle, and a rotary conveyor extending into said receptacle and protruding through said aperture, said conveyor being positively geared to said receptacle.

8. In a powder dispenser, a rotary receptacle, an apertured partition thereabove, a rotary longitudinally grooved conveyor extending into said receptacle and protruding through said aperture, and an annular rack fixed to said receptacle, said conveyor engaging said rack so that said receptacle is caused to rotate by the rotation of said conveyor.

9. In a powder dispenser, a rotary receptacle, an apertured partition thereabove, a rotary conveyor formed as a pinion at one end and extending into said receptacle and protruding segmentally through said aperture, and an annular rack fixed to said receptacle and engaging said pinion.

10. In a powder dispenser, a rotary receptacle, an apertured partition thereabove, an elongated pinion extending into said receptacle and protruding through said aperture, and an annular rack fixed to said receptacle and engaging said pinion.

11. A powder dispenser comprising a casing, a rotary receptacle supported thereby, an apertured partition fixed to said casing above said receptacle, the opposite edges of said aperture being turned down to form lugs, an arbor journaled in said lugs, a rotary conveyor formed as a pinion at one end, fixed to said arbor and extending into said receptacle and protruding through said aperture, and a rack fixed to the bottom of said receptacle and engaging said pinion.

12. A powder dispenser comprising a casing, a rotary receptacle supported thereby, a partition fixed to said casing above said receptacle and having an elongated aperture, the transverse edges of said aperture being turned down to form lugs, an arbor journaled in said lugs, a relatively narrow cogged idler mounted at one end of said arbor, a rotary conveyor formed as a pinion at one end, fixed to the rest of said arbor, and a rack fixed to the bottom of said receptacle and engaging said pinion.

13. A powder dispenser comprising a casing, a rotary receptacle supported thereby, a partition fixed to said casing above said receptacle and having an elongated aperture, the transverse edges of said aperture being turned down to form lugs, and arbor journaled in said lugs, a relatively narrow cogged idler mounted at one end of said arbor, an elongated pinion fixed to the rest of said arbor, and a rack fixed to the bottom of said receptacle and engaging said pinion.

14. A powder dispenser comprising a casing, a rotary receptacle supported thereby, a partition fixed to said casing above said receptacle and having an elongated aperture, the transverse edges of said aperture being turned down to form lugs, an arbor journaled in said lugs, a relatively narrow cogged idler mounted at one end of said arbor, an elongated pinion fixed to the rest of said arbor, and extending into said receptacle and protruding through said aperture, a rack fixed to the bottom of said receptacle and engaging said pinion, and baffles attached to the underside of said partition.

15. A power dispenser comprising a casing, a rotary receptacle having on its underside a conical pivot supported in a conical depression in the bottom of said casing, a partition fixed to said casing above said receptacle and having an elongated aperture, the transverse edges of said aperture being turned down to form lugs, an arbor journaled in said lugs, a relatively narrow cogged idler mounted at one end of said arbor, an elongated pinion fixed to the rest of said arbor, and extending into said receptacle and protruding segmentally through said aperture, a rack fixed to the bottom of said receptacle and engaging said pinion, and baffles attached to the underside of said partition.

In witness whereof I affix my signature.

GEORGES BOURQUIN.